United States Patent
Lee et al.

(10) Patent No.: US 7,570,945 B2
(45) Date of Patent: Aug. 4, 2009

(54) HOME NETWORK SYSTEM AND A METHOD FOR PERFORMING CONTINUOUS DATA TRANSFER IN THE HOME NETWORK SYSTEM

(75) Inventors: Yoon-Sun Lee, Seoul (KR); Jae-Yeon Song, Seoul (KR); Se-Youn Lim, Seoul (KR); Seo-Won Kwon, Seoul (KR); Ji-Eun Keum, Suwon-si (KR); Jong-Hwa Lee, Suwon-si (KR); Jeong-Min You, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 979 days.

(21) Appl. No.: 11/136,502

(22) Filed: May 25, 2005

(65) Prior Publication Data
US 2006/0018309 A1    Jan. 26, 2006

(30) Foreign Application Priority Data
Jul. 5, 2004    (KR) ...................... 10-2004-0051908

(51) Int. Cl.
*H04Q 7/22*    (2006.01)
(52) U.S. Cl. .................... 455/422.1; 455/442; 455/436; 370/331
(58) Field of Classification Search .............. 455/422.1, 455/442, 436; 370/331
See application file for complete search history.

(56) References Cited

U.S. PATENT DOCUMENTS
5,974,035 A  *  10/1999  Norp ........................... 370/331

FOREIGN PATENT DOCUMENTS

| JP | 2003-047037 | 2/2003 |
|---|---|---|
| JP | 2003-069617 | 3/2003 |
| JP | 2004-056336 | 2/2004 |
| JP | 2004-297205 | 10/2004 |
| WO | WO 03/041341 | 5/2003 |

OTHER PUBLICATIONS

Japanese Office Action issued on Nov. 13, 2007, corresponding to Japanese patent application No. 2005-196473.

* cited by examiner

*Primary Examiner*—Nghi H Ly
(74) *Attorney, Agent, or Firm*—Robert E. Bushnell, Esq.

(57) ABSTRACT

A home network system for supporting continuity of data transfer destined for an MS (Mobile Station) when the MS moves between wireless nodes, comprising a server for storing multimedia data and a network connecting the server to the MS via the wireless nodes. A first wireless node, while transferring predetermined data from the server to the MS, senses that a connection with the MS is cut off. The predetermined data to be transferred to the MS is then buffered in one or more of the wireless nodes at a time point of disconnection with the MS, and the first wireless node maintains a connection with the server. A second wireless node in the home network system establishes a connection with the MS and, in response a data transfer request from the MS, provides the buffered data to the MS.

34 Claims, 9 Drawing Sheets

HOME NETWORK SYSTEM AND A METHOD FOR PERFORMING CONTINUOUS DATA TRANSFER IN THE HOME NETWORK SYSTEM

CLAIM OF PRIORITY

This application claims priority to an application entitled "SUCCESSIVE DATA TRANSMITTING METHOD IN HOME NETWORK SYSTEM", filed in the Korean Intellectual Property Office on Jul. 5, 2004 and assigned Application No. 10-2004-0051908.

BACKGROUND OF THE INVENTION

The present invention relates to a home network, and more particularly to a method for supporting continuous data transfer destined for an MS (Mobile Station).

In modern society, MSs (Mobile Stations) are necessities of life that users carry at all times irrespective of places such as offices, homes, etc. MSs serve as core devices in a high-technology field with the convergence of various functions capable of reproducing and storing multimedia such as MP3 (MPEG layer 3), video, photos, etc.

In particular, with the convergence of high technology such as home network technology and advanced technology-based devices, a service by which the users can easily receive and consume content within a specific zone anytime is the general tendency.

However, a case where a handover or roaming between wireless nodes is not supported may frequently occur in the home network. Because zones covered by the wireless nodes may be discretely formed, multimedia data transfer is cut off when the MS is moved to a new location while receiving multimedia data through a PC (Personal Computer), etc. provided in the home network. For this reason, an effective multimedia data service cannot be provided.

A case where a MS located within a wireless zone covered by a first wireless node is moved to a wireless zone covered by a second wireless node will be described. In this case, no handover or roaming technology is supported between the wireless nodes.

When the MS coupled to a network and a server through the first wireless node exits the first wireless zone in the course of receiving the multimedia data from the server, the connection between the MS and the first wireless node is cut off. Even though the MS is moved to the wireless zone of the second wireless node, because no handover or roaming technology is supported between the wireless nodes, it cannot continuously receive data subsequent to already received data. That is, an MS moved to the wireless zone of the second wireless node must establish a new connection with the second wireless node and the server so that data can be transferred.

When the MS is moved to a new location, because no handover or roaming technology between wireless nodes is supported, data transfer is cut off. In this case, multimedia data to be reproduced or content to be downloaded is cut off, such that a user is inconvenienced. There is a problem in that the MS must make a data retransmission request after establishing a new connection with the other wireless node to which the MS is moved.

SUMMARY OF THE INVENTION

Therefore, the present invention has been made in view of the above and other problems, and it is an object of the present invention to provide a method capable of supporting continuous or seamless data transfer destined for an MS (Mobile Station) when the MS is moved between wireless nodes in a home network system.

In accordance with one aspect of the present invention, the above and other objects can be accomplished by the provision of, in a home network system comprising a server for storing multimedia data, a plurality of wireless nodes for wired/wireless connection, a network for connecting the server to the plurality of wireless nodes and an MS (Mobile Station) for performing the wireless connection through at least one wireless node, a method for providing continuous data transfer when the MS is moved between the wireless nodes while data is sent from the server, comprising the steps of: (a) while a first wireless node connected to the MS receives predetermined data from the server through the network and transfers the received data to the MS, sensing the fact that a connection with the MS is cut off; (b) when the connection with the MS is cut off, buffering the predetermined data to be transferred to the MS at a time point of disconnection with the MS in a state in which the first wireless node maintains a connection with the server; (c) by a second wireless node in the home network system, establishing a connection with the MS and receiving, from the MS, a continuous-data-transfer request for the predetermined data; (d) by the second wireless node, searching for the first wireless node serving as a corresponding wireless node buffering the data in the home network system in response to the continuous-data-transfer request, and establishing a connection with the first wireless node; and (e) by the second wireless node, receiving the buffered data from the first wireless node and transferring the received buffered data to the MS.

In accordance with another aspect of the present invention, the above and other objects can be accomplished by the provision of, in a home network system comprising a server for storing multimedia data, a plurality of wireless nodes for wired/wireless connection, a network for connecting the server to the plurality of wireless nodes and an MS (Mobile Station) for performing the wireless connection through at least one wireless node, a method for providing continuity of data transfer when the MS is moved between the wireless nodes while data is sent from the server, comprising the steps of: (a) while a first wireless node connected to the MS receives predetermined data from the server through the network and transfers the received data to the MS, sensing the fact that a connection with the MS is cut off and notifying the server of a disconnection with the MS; (b) when the connection between the first wireless node and the MS is cut off, broadcasting the predetermined data, to be transferred to the MS, from the server to all the wireless nodes in the home network system; (c) by a second wireless node in the home network system, establishing a connection with the MS and receiving, from the MS, a continuous-data-transfer request for the predetermined data; (d) by the second wireless node, transferring the broadcast data received at the step (b) to the MS, and notifying the server of the fact that the connection with the MS is established; and (e) by the second wireless node, receiving data subsequent to the broadcast data from the server and transferring the subsequent data to the MS.

In accordance with another aspect of the present invention, the above and other objects can be accomplished by the provision of, in a home network system comprising a server for storing multimedia data, a plurality of wireless nodes for wired/wireless connection, a network for connecting the server to the plurality of wireless nodes and an MS (Mobile Station) for performing the wireless connection through at least one wireless node, a method for providing continuity of data transfer when the MS is moved between the wireless nodes while data is sent from the server, comprising the steps of: (a) while a first wireless node connected to the MS receives predetermined data from the server through the network and transfers the received data to the MS, sensing the fact that a connection with the MS is cut off; (b) when the connection with the MS is cut off, buffering the predetermined data to be transferred to the MS at a time point of disconnection with the MS in a state in which the first wireless node maintains a connection with the server, and broadcasting the buffered data from the first wireless node to all the wireless nodes in the home network system; (c) by a second wireless node in the home network system, establishing a connection with the MS and receiving, from the MS, a continuous-data-transfer request for the predetermined data; (d) by the second wireless node in response to the continuous-data-transfer request, transferring the broadcast data received at the step (b) to the MS, and notifying the first wireless node of the fact that the connection with the MS is established; and (e) by the second wireless node, receiving data subsequent to the broadcast data from the server through the first wireless node and transferring the subsequent data to the MS.

In accordance with another aspect of the present invention, the above and other objects can be accomplished by the provision of, in a home network system comprising a server for storing multimedia data, a plurality of wireless nodes for wired/wireless connection, a network for connecting the server to the plurality of wireless nodes and an MS (Mobile Station) for performing the wireless connection through at least one wireless node, a method for providing continuity of data transfer by means of the server when the MS is moved between the wireless nodes while data is sent from the server, comprising the steps of: (a) by the server connected to the MS through a first wireless node, transferring predetermined data to the MS; (b) receiving, from the first wireless node, a message indicating that a connection with the MS is cut off; (c) when the connection between the first wireless node and the MS is cut off, broadcasting, to all the wireless nodes in the home network system, the predetermined data to be transferred to the MS; (d) receiving a message indicating that a connection with the MS is established, from a second wireless node within a predetermined time from the broadcasting at the step (c); and (e) in response to the message at the step (d), transferring data subsequent to the broadcast predetermined data to the second wireless node.

In accordance with yet another aspect of the present invention, the above and other objects can be accomplished by the provision of, in a home network system comprising a server for storing multimedia data, a plurality of wireless nodes for wired/wireless connection, a network for connecting the server to the plurality of wireless nodes and an MS (Mobile Station) for performing the wireless connection through at least one wireless node, a method for providing continuity of data transfer by means of a first wireless node serving as one of the plurality of wireless nodes when the MS is moved between the wireless nodes while data is sent from the server, comprising the steps of: (a) by the first wireless node connected to the MS, sensing the fact that the connection with the MS is cut off while the first wireless node receives predetermined data from the server through the network; (b) when the connection with the MS is cut off, maintaining a connection with the server and buffering the predetermined data to be transferred to the MS; (c) broadcasting the buffered predetermined data to all the wireless nodes in the home network system; (d) receiving a message indicating that a connection with the MS is established, from a second wireless node within a predetermined time from a broadcasting time point;  and (e) in response to the message at the step (d), receiving data subsequent to the broadcast predetermined data from the server and transferring the subsequent data to the MS through the second wireless node.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following description, a detailed description of known functions and configurations incorporated herein will be omitted when it may obscure the subject matter of the present invention.

The present invention defines an example of a home network system. The present invention is not limited to the home network system. That is, an algorithm of the present invention is applicable to all forms of local or personal network systems such as hot spots, office networks, etc.

Here, no handover or roaming technology is supported between wireless nodes of the network system. The wireless nodes cover an individual wireless zone, respectively. That is, a system in which a network is connected between the wireless nodes is exemplified herein.

In the embodiments to be described below, MSs (Mobile Stations) 15 and 15' are the same. The MS 15 is the MS 15' moved to a new location.

Figure 1:
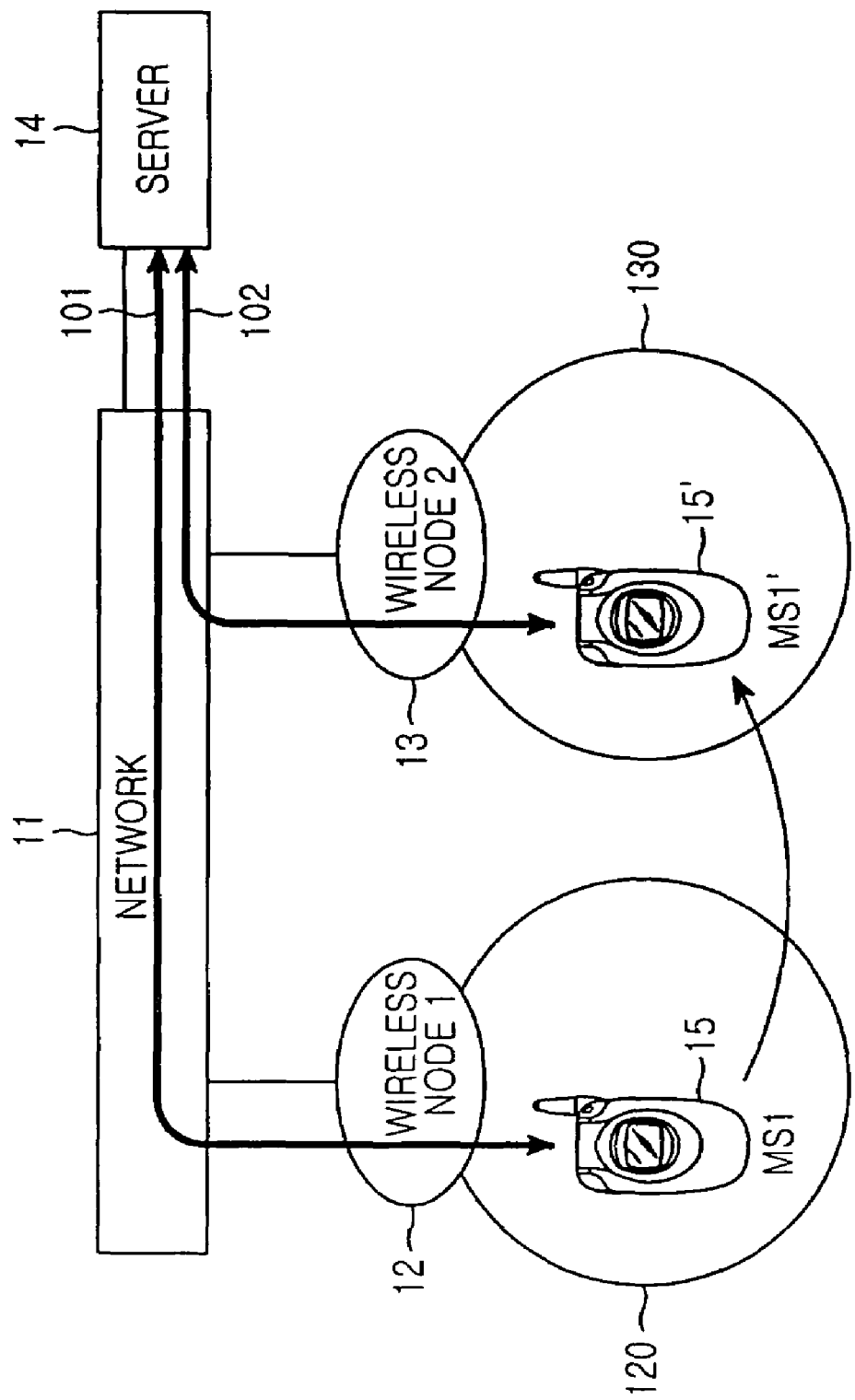
FIG. 1 exemplarily shows the configuration of a local network system for performing data transfer when a MS (Mobile Station) is moved between wireless nodes in a home network.

FIG. 1 exemplarily shows the configuration of a local network system for data transfer when a MS (Mobile Station) is moved between wireless nodes.

As shown in FIG. 1, the local network system comprises: first and second wireless nodes 12 and 13 for covering wireless zones 120 and 130 with a predetermined range and connecting to an MS 15 through a wireless connection; a server 14 for storing multimedia data, etc. and transferring the multimedia data to the wireless nodes 12 and 13 through a network 11 in response to a user request; the network 11 for connecting to the first and second wireless nodes 12 and 13 and the server 14; and the MS 15 for connecting to the network 11 and the server 14 through the wireless connection within the wireless zones 120 and 130 covered by the first and second wireless nodes 12 and 13, requesting that the server 14 provide multimedia data, and receiving corresponding multimedia data.

In this case, no handover or roaming technology is supported between the wireless nodes 12 and 13.

Now, a service operation when the MS is moved to a new location will be described.

First, a case where the MS 15 located within the wireless zone 120 covered by the first wireless node 12 is moved to the wireless zone 130 covered by the second wireless node 13 will be described.

When the MS 15 coupled to the network 11 and the server 14 through the first wireless node 12 as indicated by reference numeral 101 exits the wireless zone 120 in the course of receiving the multimedia data from the server 14, the connection between the MS 15 and the first wireless node 12 is cut off. Even though the MS 15 is moved to the zone 130 of the second wireless node 13, because no handover or roaming technology is supported between the wireless nodes 12 and 13, it cannot continuously receive data subsequent to already received data. That is, an MS 15 now serving as the MS 15' of the wireless zone 130 of the second wireless node 13 must establish a new connection with the second wireless node 13 and the server 14 as indicated by reference numeral 102 so that data can be transferred.

When an MS is moved to a new location, because no handover or roaming technology between wireless nodes is supported, data transfer is cut off. In this case, multimedia data to be reproduced or content to be downloaded is cut off, such that a user is inconvenienced. There is a problem in that the MS must make a data retransmission request after establishing a new connection with another wireless node to which the MS is moved.

Figure 2:
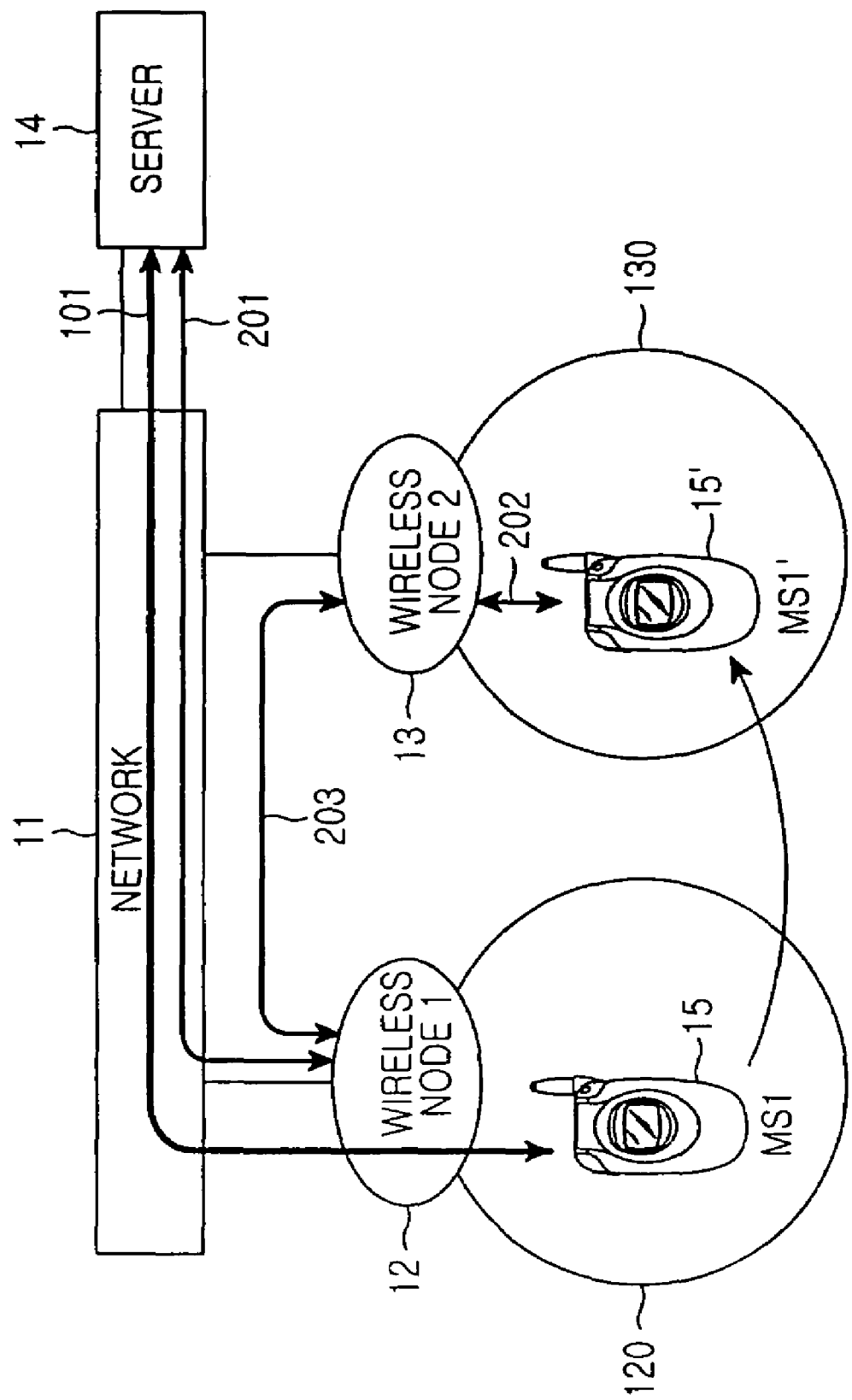
FIG. 2 exemplarily shows a first embodiment of a method for performing continuous data transfer when a MS (Mobile Station) is moved between wireless nodes in a home network system in accordance with the present invention.

FIG. 2 exemplarily shows a first embodiment of a method for performing continuous data transfer when an MS (Mobile Station) is moved between wireless nodes in a home network system in accordance with the present invention.

In the first embodiment in accordance with the present invention as shown in FIG. 2, the home network system comprises: a network 11 for supporting wired/wireless networking between devices in the home; wireless nodes 12 and 13 for a wireless network connection; a server 14 serving as a client device for storing multimedia data; and an MS (Mobile Station) 15.

Here, the wireless nodes 12 and 13 play a role in enabling communication between the wired/wireless network 11 and the MS 15. The radius of a zone (i.e., a wireless zone 120 or 130) capable of being covered by one wireless node is different according to wireless network technology applied to the MS 15. The number of wireless nodes located in the home may differ according to the radius of the overall wireless zone.

The MS 15 can reproduce or store multimedia content received from the server 14 through the wireless node 12 or 13. In this case, wireless network technologies applicable to the MS 15 are well known in the art, such as WLAN (Wireless Local Area Network), Bluetooth and UWB (Ultra Wideband).

The server 14 stores multimedia content such as video content, audio content, etc. and transfers the stored multimedia content to the MS 15 through the network 11. Typically, the server 14 is implemented by a PC (Personal Computer).

In the first embodiment of the present invention, different from the system shown in FIG. 1, when the MS 15 is moved from the wireless zone 120 of the first wireless node 12 to the wireless zone 130 of the second wireless node 13 in the home network system, the first wireless node 12 senses the fact that a connection with the MS 15 is cut off while data is being transferred, buffers data for a certain time period, and maintains a connection with the server 14 as indicated by reference numeral 201.

An MS 15 serving as the MS 15' moved to the wireless zone 130 establishes a connection with the second wireless node 13 as indicated by reference numeral 202. Then, the second wireless node 13 searches for an old wireless node through which data has been previously transferred to the MS, and then establishes a connection with the first wireless node 12 corresponding to the retrieved wireless node as indicated by reference numeral 203. Thus, the second wireless node 13 continuously transfers data from the server 14 to the MS 15'.

This process will be described in detail with reference to FIG. 3.

Figure 3:
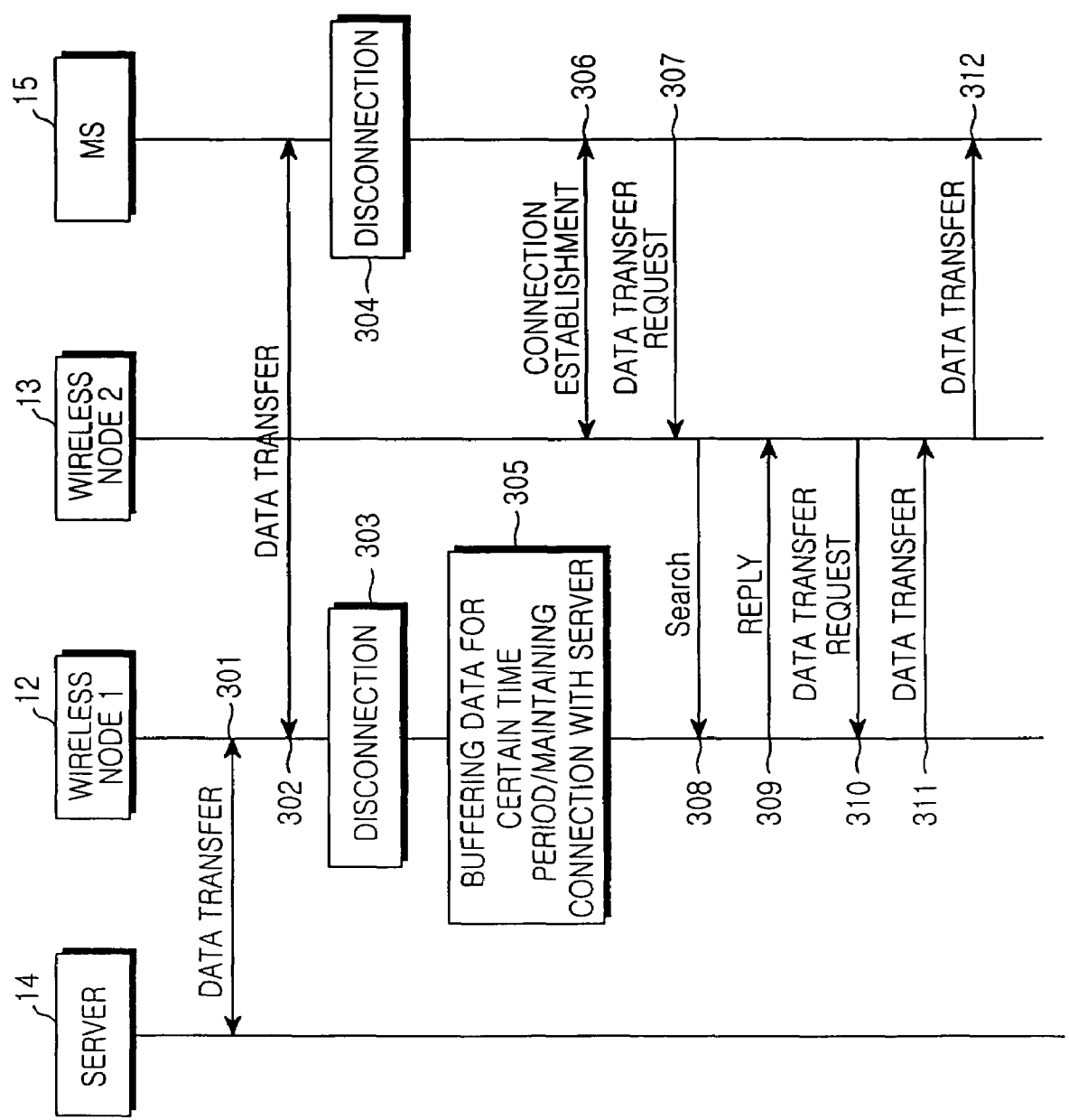
FIG. 3 is an exemplary operation flow chart illustrating the first embodiment of the method for performing continuous data transfer in the home network system in accordance with the present invention.

FIG. 3 is an exemplary operation flow chart illustrating the first embodiment of the method for performing continuous data transfer in the home network system in accordance with the present invention.

As shown in FIG. 3, when the MS 15 is moved to a new location while receiving multimedia data from the server 14 through the first wireless node 12 (301 and 302), a connection between the MS 15 and the first wireless node 12 is cut off (303 and 304).

Then, in a state in which a connection between the first wireless node 12 and the server 14 is maintained without being immediately cut off, data to be transferred to the MS 15 is buffered (305) in the first wireless node 12 for a predetermined time period when the connection with the MS 15 is cut off.

If data starts to be buffered, which is generated from when the connection with the MS 15 has been cut off, a time gap may occur between data transmission of a transmitting terminal (e.g., the first wireless node 12) and data reception of a receiving terminal (e.g., the MS 15). That is, when the connection is cut off while the first wireless node 12 transmits data and the MS 15 receives data, data may be lost. To prevent data loss due to the time gap between data transmission of the transmitting terminal and data reception of the receiving terminal, the first wireless node 12 can be controlled to buffer data for a predetermined retroactive time period prior to the data last transferred from the first wireless node 12.

Here, the buffering may be performed also when the MS 15 completely exits a zone of the home network system and hence continuous data transfer is impossible, or when the user does not desire to reproduce and store continuous data by means of the MS 15. A data buffering time in the first wireless node 12 can be differently defined according to characteristics of the use environment. When a data transfer request is not received from another wireless node (e.g., the second wireless node 13) for a certain time period, the buffering is stopped and the buffered data is deleted.

The MS 15 is moved to a new wireless zone and establishes a connection with the second wireless node 13 (306). The MS 15 then makes a data transfer request (307). At this point, the data transfer request must include an indication of a continuous-data-transfer request rather than a new-data-transfer request and information about data being currently transferred. Here, the data transfer request can be made when the connection with the second wireless node 13 is established.

The second wireless node 13 receiving the data transfer request (continuous-data-transfer request) searches for a wireless node temporarily storing (buffering) corresponding data from among adjacent wireless nodes or wireless nodes in the home (308). That is, the second wireless node 13 receiving the continuous-data-transfer request searches for an old wireless node, temporarily storing data being transferred, that was connected to the MS 15 by broadcasting a search message to all the wireless nodes within the home network system through the network 11 at the above step 308.

In this case, first wireless node 12 confirms information about an ID (Identity or Identifier) of a corresponding MS 15, an assigned address, etc. and then makes a reply (309).

When receiving the reply from the first wireless node 12 as a result of the search, the second wireless node 13 sends the continuous-data-transfer request to the first wireless node 12 (310). On the other hand, the second wireless node 13 makes a new-data-transfer request (not shown) of server 14 if a reply is not received as a result of the search.

In response to the data transfer request, the first wireless node 12 sends the buffered data and receives continuous data from the server 14 (301) to send the received data to the second wireless node 13 (311). Then, the second wireless node 13 transfers the data received from the first wireless node 12 to the MS 15 (312).

Thus, the first wireless node 12 serves as a channel for transferring data from the server 14 to the second wireless node 13.

When the second wireless node 13 receives the buffered data from the first wireless node 12 and transfers the received data to the MS 15, the data stored in the MS 15 and the buffered data may be partially equal to each other, because the buffered data is data for a preset retroactive time period. That is, because of the preset retroactive time period, the buffered data is not exactly connected to a cutoff data location. To perform the exact data connection, the second wireless node 13 searches for the final location of data received by the MS 15 at a time point of disconnection between the first wireless node 12 and the MS 15 from the continuous-data-transfer request message of the MS 15. Thus, the second wireless node 13 discards data before a corresponding location among the data buffered by the first wireless node 12 and transfers only the buffered data after the corresponding location to the MS 15.

Figure 4:
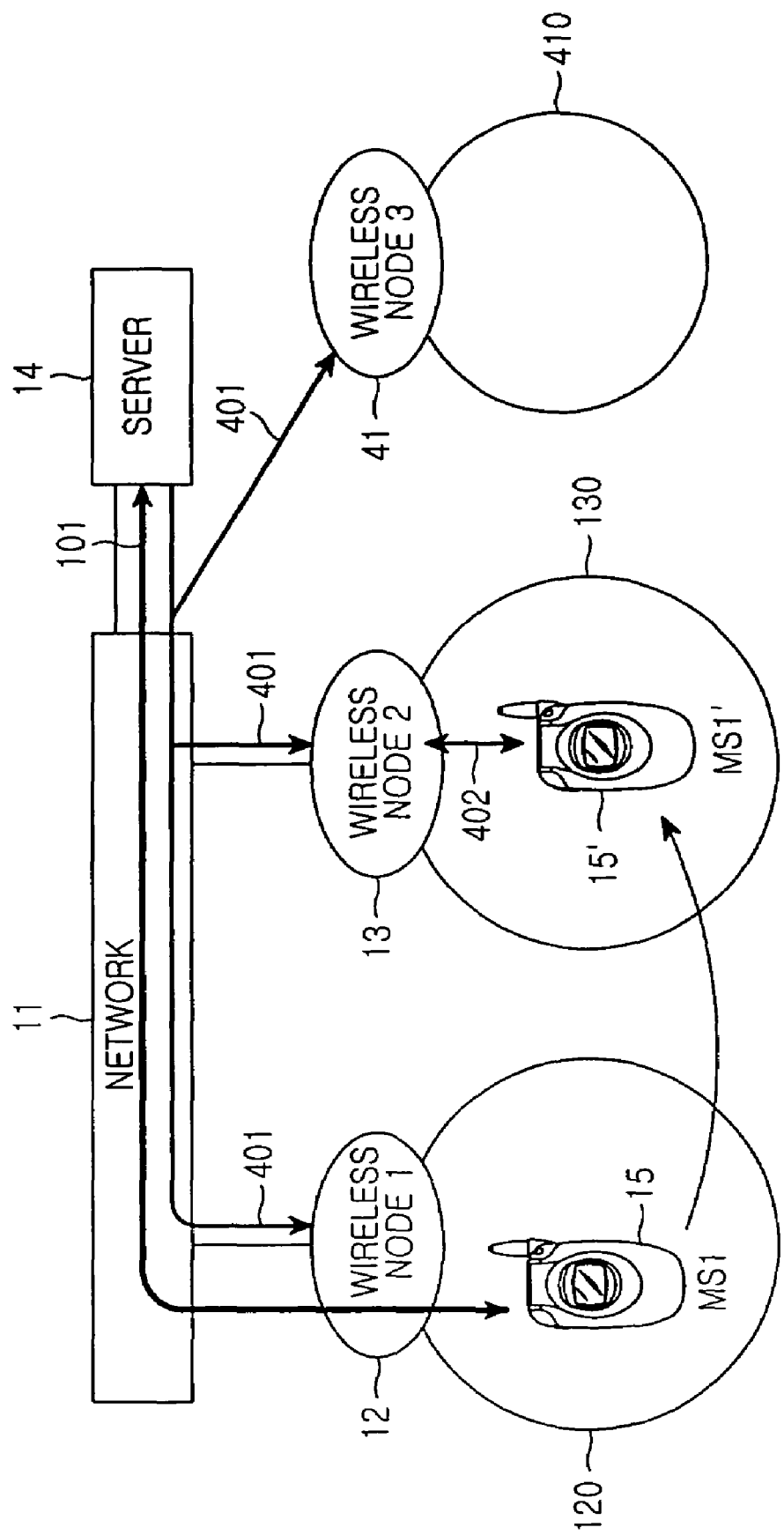
FIG. 4 exemplarily shows a second embodiment of the method for performing continuous data transfer in the home network system in accordance with the present invention.

FIG. 4 exemplarily shows a second embodiment of the method for performing continuous data transfer in the home network system in accordance with the present invention.

In the second embodiment in accordance with the present invention as shown in FIG. 4, the home network system comprises a network 11 for supporting wired/wireless networking between devices in the home; wireless nodes 12, 13 and 41 for a wireless network connection; a server 14 serving as one client device for storing multimedia data, etc.; and an MS (Mobile Station) 15.

Here, the wireless nodes 12, 13 and 41 play a role in enabling communication between the wired/wireless network 11 and the MS 15, respectively. The radius of a zone (i.e., a wireless zone 120 or 130) capable of being covered by one wireless node is different according to wireless network technology applied to the MS 15. The number of wireless nodes located in the home may differ according to the radius of the overall wireless zone.

The MS 15 can reproduce or store multimedia content received from the server 14 through the wireless nodes 12, 13 and 41. In this case, wireless network technologies applied to the MS 15 are well known in the art, such as WLAN (Wireless LAN), Bluetooth or UWB (Ultra Wideband).

The server 14 stores multimedia content such as video content, audio content, etc. and transfers the stored multimedia content to the MS 15 through the network 11. The server 14 is typically implemented by a PC (Personal Computer).

In the second embodiment of the present invention, different from the system shown in FIG. 2, when the MS 15 is moved from the wireless zone 120 of the first wireless node 12 to the wireless zone 130 of the second wireless node 13 in the home network system, the fact that a connection with the MS 15 is cut off is sensed while the first wireless node 12 is transferring data, and the server 14 is notified of a disconnection between the MS 15 and the first wireless node 12. Then, the server 14 broadcasts data being transferred to the MS 15 to all wireless nodes as indicated by reference numeral 401 so that data can be transferred without delay when a new connection between the MS 15 and one of the wireless nodes is established within a predetermined time.

When, the MS 15' moved to the wireless zone 130 establishes a connection with the second wireless node 13 as indicated by reference numeral 402, the second wireless node 13 transfers the data broadcast from the server 14 to the MS 15', and continuously transfers corresponding multimedia data while maintaining a connection with the server 14.

This process will be described in detail with reference to FIG. 5.

Figure 5:
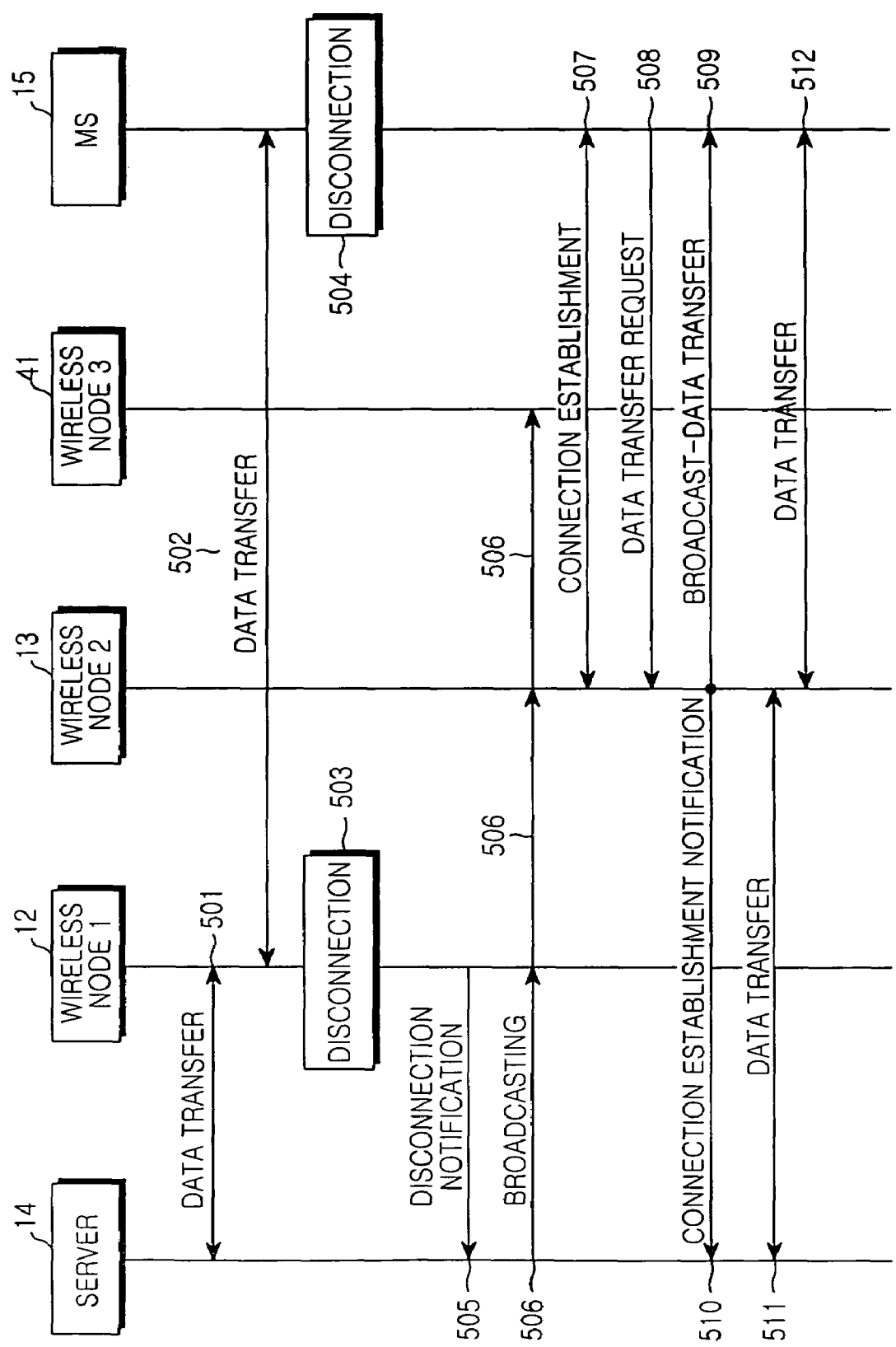
FIG. 5 is an exemplary operation flow chart illustrating the second embodiment of the method for performing continuous data transfer in the home network system in accordance with the present invention.

FIG. 5 is an exemplary operation flow chart illustrating the second embodiment of the method for performing continuous data transfer in the home network system in accordance with the present invention.

As shown in FIG. 5, when the MS 15 is moved to a new location while receiving multimedia data from the server 14 through the first wireless node 12 (501 and 502), a connection between the MS 15 and the first wireless node 12 is cut off (503 and 504).

Then, the first wireless node 12 notifies the server 14 of the fact that the connection with the MS 15 is cut off (505). In response to the notification, the server 14 broadcasts, to all the wireless nodes, data to be transferred to the MS 15 (506). Here, in a process in which the first wireless node 12 notifies the server 14 of the fact that the connection with the MS 15 is cut off (505), a message is transferred which includes identifying information about the MS 15, information about data being currently transferred and information about finally (last) transferred data.

The wireless nodes 12, 13 and 41 buffer the data broadcast by the server 14 for a certain time period, respectively. Here, the buffering may be performed also when the MS 15 completely exits a zone of the home network system and hence continuous data transfer is impossible, or when the user does not desire to reproduce and store continuous data by means of the MS 15. A data buffering time in all the wireless nodes 12, 13 and 41 within the home network system can be differently defined according to characteristics of the use environment.

If data starts to be broadcast which is generated from when the connection with the MS 15 has been cut off, a time gap may occur between data transmission of a transmitting terminal (e.g., the first wireless node 12) and data reception of a receiving terminal (e.g., the MS 15). That is, when the connection is cut off while the first wireless node 12 transmits data and the MS 15 receives data, data may be lost. To prevent the data loss, the server 14 can generate and broadcast data for a predetermined retroactive time period prior to the data last transferred from the first wireless node 12.

The MS 15 is moved to a new wireless zone and establishes a connection with, for example, the second wireless node 13 (507). Then, the MS 15 makes a data transfer request (508). At this point, the data transfer request must include an indication of a continuous-data-transfer request rather than a new-data-transfer request and includes information about data being currently transferred.

The second wireless node 13 receiving the data transfer request (continuous-data-transfer request) at the above step 508 transfers the data broadcast by the server 14 to the MS 15 (509), and notifies the server 14 of the fact that the connection with the MS 15 is established (510), that is, notifies the server 14 of the fact that subsequent data will be transferred to the MS 15 through the second wireless node 13.

According to information about the connection establishment, the server 14 transfers continuous data to the second wireless node 13 (511). Then, the second wireless node 13 transfers data received from the server 14 to the MS 15 (512).

When the second wireless node 13 transfers the data broadcast from the server 14 to the MS 15, the data stored in the MS 15 and the broadcast data may be partially equal to each other, because the broadcast data is data for a preset retroactive time period. Because of the preset retroactive time period, exact time-zone data cannot be broadcast, such that data is not exactly connected to a cutoff data location. To perform the exact data connection, the second wireless node 13 searches for the final location of data received by the MS 15 at a time point of disconnection between the first wireless node 12 and the MS 15 from the continuous-data-transfer request message from the MS 15. Thus, the second wireless node 13 discards data before a corresponding location among the data broadcast from the server 14 and transfers only broadcast data after the corresponding location to the MS 15.

Figure 6:
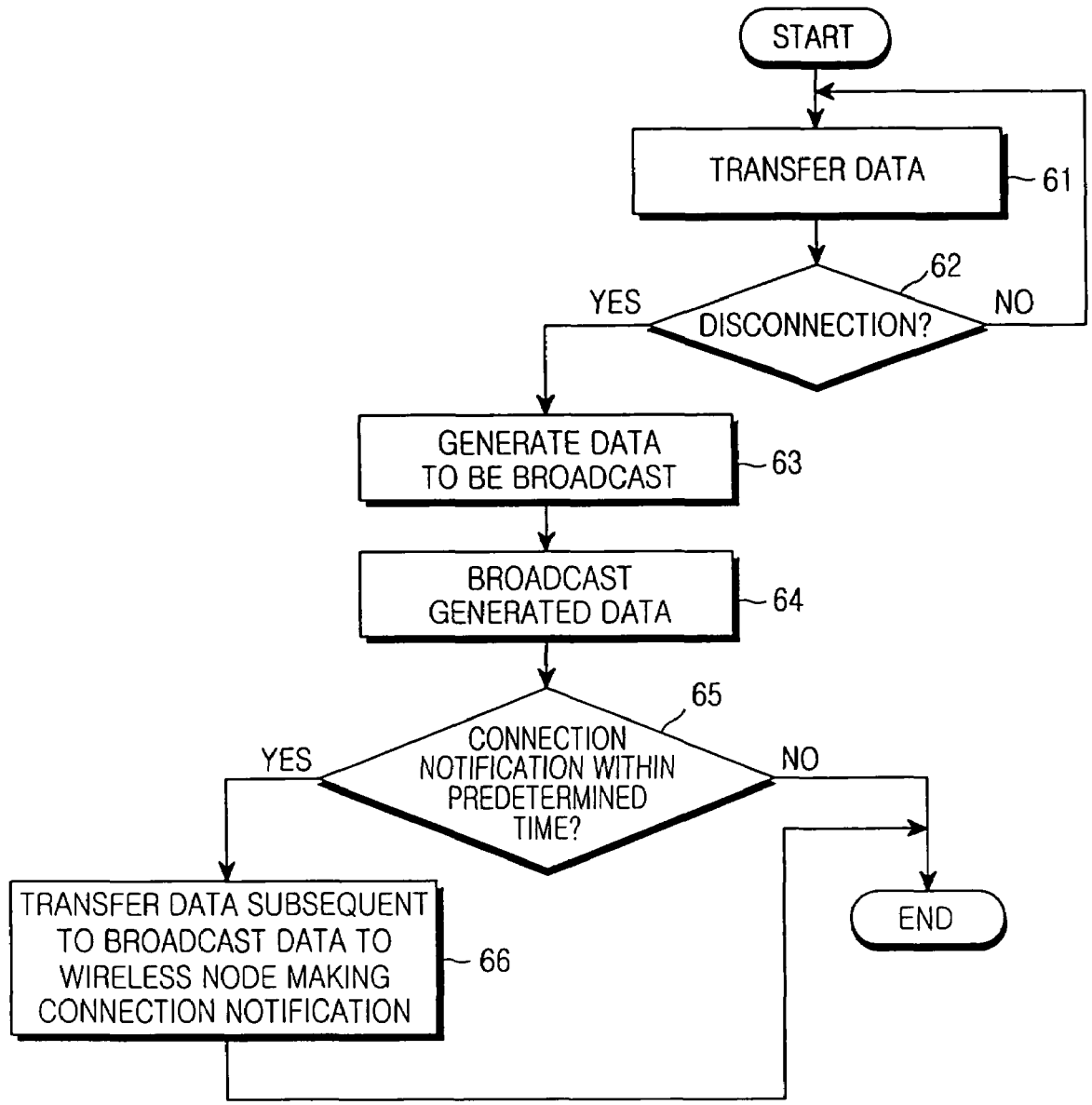
FIG. 6 is an exemplary flow chart illustrating operation of a server in the second embodiment of the method for performing continuous data transfer in the home network system in accordance with the present invention.

FIG. 6 is an exemplary flow chart illustrating operation of the server 14 in the second embodiment of the method for performing continuous data transfer in the home network system in accordance with the present invention.

According to FIG. 6, the server 14 transfers stored data through the first wireless node 12 in response to a request from the MS 15 (61).

While transferring data, the server 14 periodically determines whether or not a connection is cut off (62). The presence of a disconnection is determined through a message from the first wireless node 12 indicating that the connection with the MS 15 is cut off. The message indicating the disconnection received from the first wireless node 12 includes information about the MS 15 in which the connection is currently cut off, information about data being currently transferred and information about finally transferred data.

When receiving the message indicating that the connection with the MS 15 is cut off, the server 14 generates data for a certain time period at a predetermined time point prior to disconnection as data to be broadcast (63).

That is, when the connection with the MS 15 is cut off, a gap between data transmitted by the server 14 or the first wireless node 12 and data received by the MS 15 may occur. To prevent data loss when the connection is cut off, the server 14 can generate data for a predetermined retroactive time period prior to the data to be currently transferred from the first wireless node 12, as data to be broadcast.

Then, the server 14 broadcasts the generated data to all the wireless nodes in the home network system (64).

Each of the wireless nodes 12, 13 and 41 buffer the data broadcast by the server 14 for a certain time period.

When the server 14 receives a message indicating that a new connection with the MS 15 is established from one of the wireless nodes in the home network before time-out (that is, within a time period in which each wireless node buffers the broadcast data) (65), it continuously transfers data, subsequent to the broadcast data of step 64, to newly connected wireless node (66) so that continuous data transfer can be provided to the MS 15.

When the server 14 does not receive a message indicating that a new connection with the MS 15 is established from one of the wireless nodes in the home network before time-out (that is, within a time period in which each wireless node buffers the broadcast data) (65), it terminates continuous data transfer.

Figure 7:
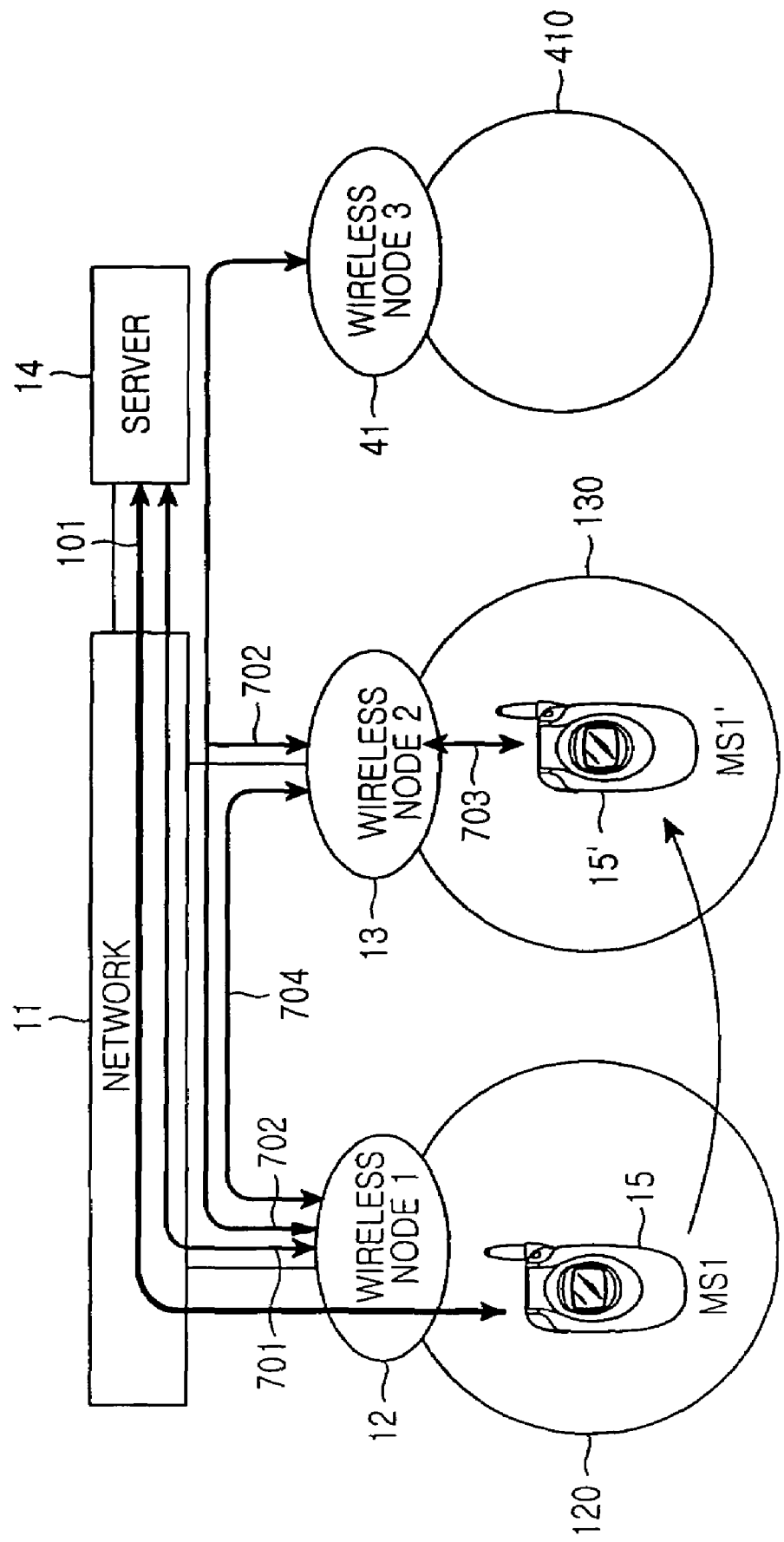
FIG. 7 exemplarily shows a third embodiment of the method for performing continuous data transfer in the home network system in accordance with the present invention.

FIG. 7 exemplarily shows a third embodiment of the method for performing continuous data transfer in the home network system in accordance with the present invention.

In the third embodiment in accordance with the present invention as shown in FIG. 7, the home network system comprises a network 11 for supporting wired/wireless networking between devices in the home; wireless nodes 12, 13 and 41 for a wireless network connection; a server 14 serving as a client device for storing multimedia data, etc.; and a MS (Mobile Station) 15. The above-mentioned components are the same as the components shown in FIG. 4 in the second embodiment.

In the third embodiment of the present invention, different from the system shown in FIG. 4, when the MS 15 is moved from the wireless zone 120 of the first wireless node 12 to the wireless zone 130 of the second wireless node 13 in the home network system, a connection between the server 14 and the first wireless node 12 is maintained for a certain time as indicated by reference numeral 701, when the fact that a connection with the MS 15 is cut off is sensed while the first wireless node 12 transfers data. At a disconnection time point, data being currently transferred to the MS 15 is broadcast to all the wireless nodes 12 and 41 as indicated by reference numeral 702 so that data can be transferred without delay when a new connection with the MS 15 is established within a predetermined time.

Then, the MS 15 (15'), if moved to the wireless zone 130, establishes a connection with the second wireless node 13 as indicated by reference numeral 703, and the second wireless node 13 transfers the data broadcast from the first wireless node 12 to the MS 15, and continuously transfers corresponding multimedia data while maintaining a connection with the server 14 as indicated by reference numeral 704.

This operation will be described in detail with reference to FIG. 8.

Figure 8:
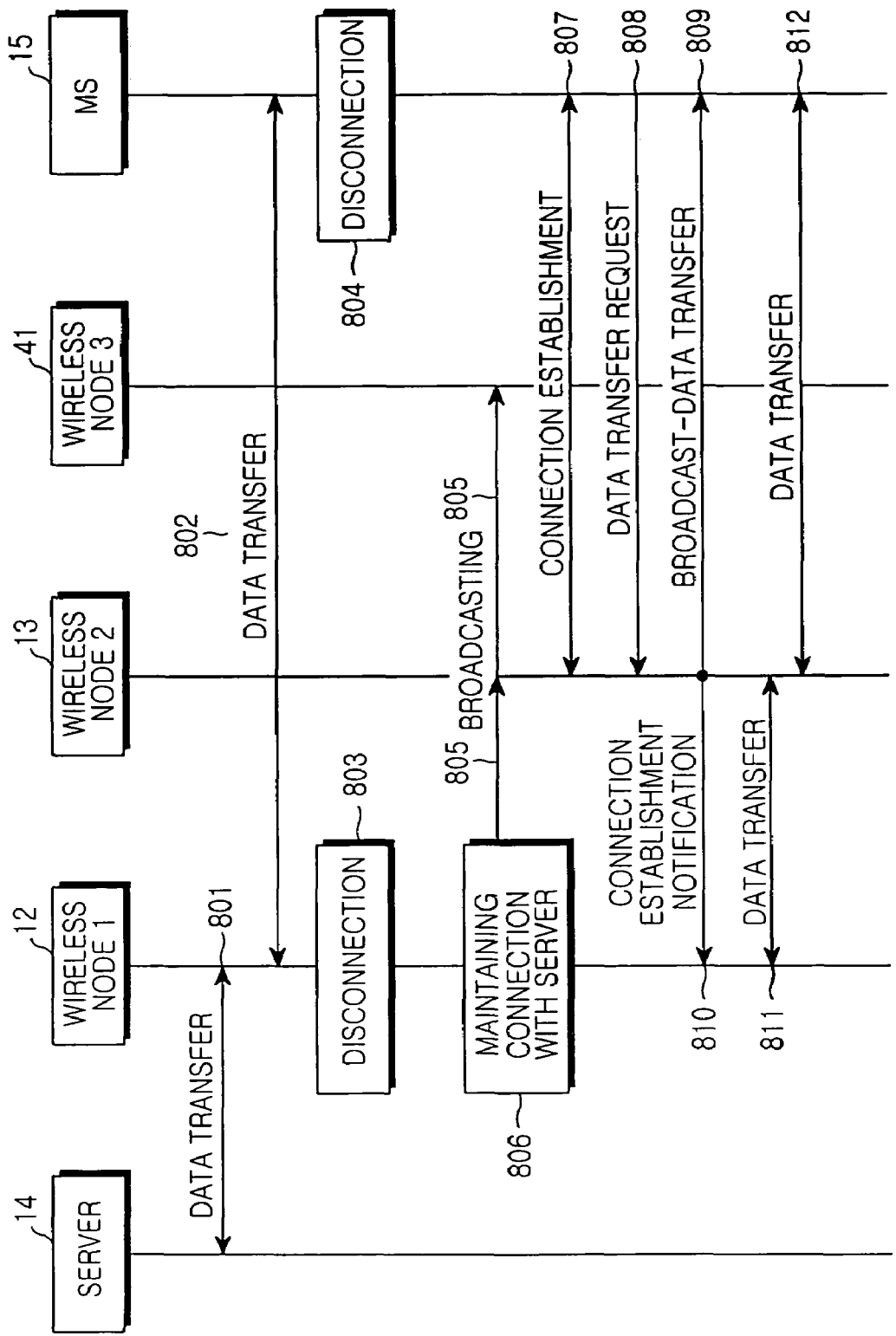
FIG. 8 is an exemplary operation flow chart illustrating the third embodiment of the method for performing continuous data transfer in the home network system in accordance with the present invention.

FIG. 8 is an exemplary operation flow chart illustrating the third embodiment of the method for performing continuous data transfer in the home network system in accordance with the present invention.

As shown in FIG. 8, when the MS 15 is moved to a new location while receiving multimedia data from the server 14 through the first wireless node 12 (801 and 802), a connection between the MS 15 and the first wireless node 12 is cut off (803 and 804).

Then, in a state in which a connection between the first wireless node 12 and the server 14 is maintained (806) without being immediately cut off, data to be transferred to the MS 15 is buffered for a predetermined time period when the connection with the MS 15 is cut off. Then, the first wireless node 12 broadcasts the buffered data to all the wireless nodes 13 and 41 (805).

At this point, both the wireless nodes 13 and 41 buffer the data broadcast by the first wireless node 12 for a certain time period. Here, the buffering may be performed also when the MS 15 completely exits a zone of the home network system and hence continuous data transfer is impossible, or when the user does not desire to reproduce and store continuous data by means of the MS 15. A data buffering time in all the wireless nodes 12, 13 and 41 within the home network system can be differently defined according to characteristics of the use environment.

If data starts to be buffered which is generated from when the connection with the MS 15 has been cut off, a time gap may occur between data transmission of a transmitting terminal (e.g., the first wireless node) and data reception of a receiving terminal (e.g., the MS). That is, when the connection is cut off while the first wireless node transmits data and the MS 15 receives data, data may be lost. To prevent the data loss when the connection is cut off, the first wireless node 12 can be controlled to buffer and broadcast data for a predetermined retroactive time period prior to the data to be currently transferred from the transmitting terminal.

The MS 15 is moved to a new wireless zone and establishes a connection with the second wireless node 13 serving as a corresponding wireless node (807). Then, the MS 15 makes a data transfer request (808). At this point, the data transfer request must include an indication of a continuous-data-transfer request rather than a new data transfer request and information about data being currently transferred.

Then, the second wireless node 13 receiving the continuous-data-transfer request (data transfer request) at the above step 808 transfers the buffered data, broadcast by the first wireless node 12 at step 805, to the MS 15 (809), and notifies the first wireless node 12 of the fact that the connection with the MS 15 is established (810). In the notification of the connection establishment at the above step 810, a data transfer request is made. That is, the second wireless node 13 requests that the first wireless node 12 provide the data from the server 14 to be transferred to the MS 15.

According to information about the connection establishment, the first wireless node 12 receives continuous data from the server 14 and transfers the received continuous data to the second wireless node 13 (811). Then, the second wireless node 13 transfers the data received from the first wireless node 12 to the MS 15 (812).

When the second wireless node 13 transfers data broadcast from the first wireless node 12 to the MS 15, the data stored in the MS 15 and the broadcast data may be partially equal to each other, because the broadcast data is data for a preset retroactive time period. Because of the preset retroactive time period, exact time-zone data cannot be broadcast, such that data is not exactly connected to a cutoff data location. To perform the exact data connection, the second wireless node 13 searches for the final location of data received by the MS 15 at a time point of disconnection between the first wireless node 12 and the MS 15 from the continuous-data-transfer request message from the MS 15. Thus, the second wireless node 13 discards data before a corresponding location among the data broadcast by the first wireless node 12 and transfers only broadcast data after the corresponding location to the MS 15.

Figure 9:
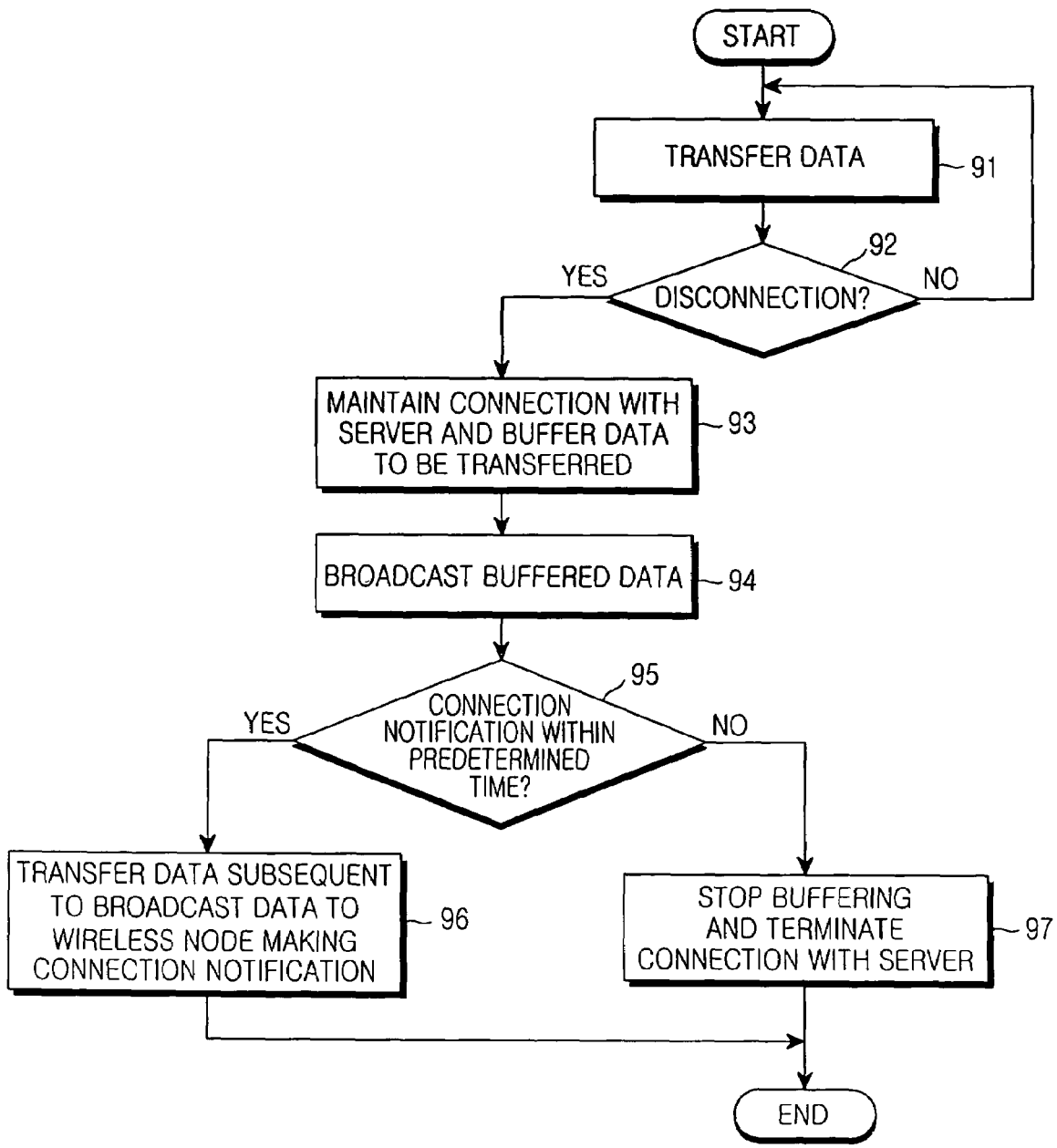
FIG. 9 is an exemplary flow chart illustrating operation of a first wireless node in the third embodiment of the method for performing continuous data transfer in the home network system in accordance with the present invention.

FIG. 9 is an exemplary flow chart illustrating operation of the first wireless node in the third embodiment of the method for performing continuous data transfer in the home network system in accordance with the present invention.

According to FIG. 9, the first wireless node 12 receives data from the server 14 in response to a request of the MS 15, and transfers the received data to the MS 15 (91).

Then, when the first wireless node 12 senses the fact that a connection with the MS 15 is cut off while the data is transferred (92), it maintains a connection with the server 14 at a disconnection time point to buffer data for a certain time period (93).

When the connection with the MS 15 is cut off, a gap may occur between data transmitted by the first wireless node 12 and data received by the MS 15. That is, when the connection is cut off while the first wireless node 12 transmits data and the MS 15 receives data, data may be lost. To prevent the data loss when the connection is cut off, data for a predetermined retroactive time period prior to data to be currently transferred by the first wireless node 12 is buffered.

Then, the buffered data is broadcast to all the wireless nodes in the home network system (94).

The wireless nodes 13 and 41 buffer the data broadcast by the first wireless node 12 for a certain time period, respectively.

When the first wireless node 12 receives a message indicating that a new connection with the MS 15 is established from one of the wireless nodes in the home network before time-out (that is, within a time period in which each wireless node buffers the broadcast data) (95), data subsequent to the broadcast data from the first wireless node 12 is transferred to a corresponding wireless node so that continuous data transfer can be provided to the MS 15 (96).

On the other hand, when the first wireless node 12 does not receive a message indicating that a new connection with the MS 15 is established from one of the wireless nodes in the home network before time-out (that is, within a time period in which each wireless node buffers the broadcast data) (95), it stops the buffering and terminates the connection with the server 14 (97).

In accordance with the present invention, a mobile station can continuously receive multimedia data when moved to various locations even though handover or roaming technology is not supported in the home network system.

The method of the present invention is implemented by a program that can be stored in a computer-readable storage medium (e.g., a CD-ROM (Compact Disk-Read Only Memory), RAM (Random Access Memory), floppy disk, hard disk, optical magnetic disk or etc.).

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments and the annexed drawings.

What is claimed is:

1. In a network system comprising a server for storing multimedia data, a plurality of wireless nodes for wired/wireless connection, a network for connecting the server to the plurality of wireless nodes and a mobile station for performing the wireless connection through at least one of said wireless nodes, a method for providing continuous data transfer when the mobile station is moved between different wireless zones covered by corresponding ones of the wireless nodes while data is sent from the server, the method comprising steps of:

sensing that a connection between a first wireless node and the mobile station is cut off, while the first wireless node is receiving predetermined data from the server through the network and transferring the received predetermined data to the mobile station;

when the connection with the mobile station is cut off, buffering, in the first wireless node, the predetermined data to be transferred to the mobile station at a time point of disconnection with the mobile station in a state in which the first wireless node maintains a connection with the server;

establishing a connection between the mobile station and a second wireless node in the home network system, and receiving from the mobile station, a continuous-data-transfer request for the predetermined data;

in response to the continuous-data-transfer request, searching, by the second wireless node, said plurality of wireless nodes for the first wireless node buffering the data, and establishing a connection with the first wireless node; and receiving, by the second wireless node, the buffered data from the first wireless node and transferring the received buffered data to the mobile station.

2. The method of claim 1, wherein the second wireless node receives predetermined data subsequent to the buffered data from the server through the first wireless node after transferring the received buffered data to the mobile station, and transfers the subsequent data to the mobile station.

3. The method of claim 1, wherein the searching step comprises steps of:

broadcasting, by the second wireless node in response to the continuous-data-transfer request, a search message to all the wireless nodes in the home network system so that a determination can be made as to where the predetermined data to be transferred to the mobile station is buffered;

making a reply, by the first wireless node, to the broadcast search message; and establishing the connection between the first and second wireless nodes according to the reply.

4. The method of claim 2, wherein the searching step comprises steps of:

broadcasting, by the second wireless node in response to the continuous-data-transfer request, a search message to all the wireless nodes in the home network system so that a determination can be made as to where the predetermined data to be transferred to the mobile station is buffered;

making a reply, by the first wireless node, to the broadcast search message; and establishing the connection between the first and second wireless nodes according to the reply.

5. The method of claim 3, wherein the search message comprises an ID (Identity or Identifier) of the mobile station and assigned address information.

6. The method of claim 1, wherein the predetermined data buffered by the first wireless node is data of a transmission block at a time point that is a predetermined time period earlier than when the connection with the mobile station is cut off.

7. The method of claim 2, wherein the predetermined data buffered by the first wireless node is data of a transmission block at a time point that is a predetermined time period earlier than when the connection with the mobile station is cut off.

8. The method of claim 1, wherein the step of receiving the buffered data from the first wireless node and transferring the received buffered data to the mobile station comprises steps of:

receiving the buffered data from the first wireless node through the established connection; and excluding data already received by the mobile station from the buffered data received from the first wireless node, and transferring remaining data to the mobile station.

9. The method of claim 3, wherein the step of receiving the buffered data from the first wireless node and transferring the received buffered data to the mobile station comprises steps of:

receiving the buffered data from the first wireless node through the established connection; and excluding data already received by the mobile station from the buffered data received from the first wireless node, and transferring remaining data to the mobile station.

10. The method of claim 6, wherein the step of receiving the buffered data from the first wireless node and transferring the received buffered data to the mobile station comprises steps of:

receiving the buffered data from the first wireless node through the established connection; and excluding data already received by the mobile station from the buffered data received from the first wireless node, and transferring remaining data to the mobile station.

11. In a home network system comprising a server for storing multimedia data, a plurality of wireless nodes for wired/wireless connection, a network for connecting the server to the plurality of wireless nodes and a mobile station for performing the wireless connection through at least one of said wireless nodes, a method for providing continuity of data transfer when the mobile station is moved between different wireless zones covered by corresponding ones of the wireless nodes while data is sent from the server, the method comprising steps of:

sensing that a connection between a first wireless node and the mobile station is cut off, while the first wireless node is receiving predetermined data from the server through the network and transferring the received predetermined data to the mobile station;

when the connection between the first wireless node and the mobile station is cut off, broadcasting the predetermined data, to be transferred to the mobile station, from the server to all the wireless nodes in the home network system;

temporarily storing the broadcast predetermined data in each of said wireless nodes;

establishing a connection between the mobile station and a second wireless node in the home network system, and receiving from the mobile station, a continuous-data-transfer request for the predetermined data;

transferring the broadcast data temporarily stored by the second wireless node to the mobile station, and notifying the server about the established connection; and receiving, by the second wireless node from the server, data subsequent to the temporarily stored broadcast data and transferring the subsequent data to the mobile station.

12. The method of claim 11, wherein all the wireless nodes in the home network system temporarily store the predetermined data, broadcast from the server, for a preset time period.

13. The method of claim 11, wherein the first wireless node transfers, to the server, information about an ID (Identity or Identifier) of the mobile station and information about a transmission block of the predetermined data being transferred at a disconnection time point, in order to notify the server of the disconnection with the mobile station when the first wireless node senses that the connection with the mobile station is cut off.

14. The method of claim 12, wherein the first wireless node transfers, to the server, information about an ID (Identity or Identifier) of the mobile station and information about a transmission block of the predetermined data being transferred at a disconnection time point, in order to notify the server of the disconnection with the mobile station when the first wireless node senses that the connection with the mobile station is cut off.

15. The method of claim 11, wherein the predetermined data broadcast by the server, when connection with the mobile station is cut off, is data of a transmission block that includes data of a predetermined time period earlier than current data being transferred.

16. The method of claim 15, wherein the step of transferring the broadcast data temporarily stored by the second wireless node to the mobile station comprises steps of:
excluding, by the second wireless node in response to the continuous-data-transfer request, data already received by the mobile station from the temporarily stored broadcast data and transferring remaining data to the mobile station; and
notifying the server that the connection with the mobile station is established.

17. In a home network system comprising a server for storing multimedia data, a plurality of wireless nodes for wired/wireless connection, a network for connecting the server to the plurality of wireless nodes and a mobile station for performing the wireless connection through at least one of said wireless nodes, a method for providing continuity of data transfer when the mobile station is moved between different wireless zones covered by corresponding ones of the wireless nodes while data is sent from the server, the method comprising steps of:
sensing that a connection between a first wireless node and the mobile station is cut off, while the first wireless node is receiving predetermined data from the server through the network and transferring the received predetermined data to the mobile station;
when the connection with the mobile station is cut off, buffering, in the first wireless node, the predetermined data to be transferred to the mobile station at a time point of disconnection with the mobile station in a state in which the first wireless node maintains a connection with the server, and broadcasting the buffered data from the first wireless node to all the wireless nodes in the home network system, wherein and all of said wireless nodes temporarily store the buffered data;;
establishing, by a second wireless node in the home network system, a connection with the mobile station and receiving, by the second wireless node, a continuous-data-transfer request from the mobile station;
transferring the temporarily stored buffered data of the second wireless node to the mobile station, in response to the continuous-data-transfer request, and notifying, by the second wireless node, the first wireless node that the connection the mobile station is established; and
receiving, by the second wireless node from the server through the first wireless node, data subsequent to the buffered broadcast data and transferring the subsequent data to the mobile station.

18. The method of claim 17, wherein all the wireless nodes in the home network system temporarily store the buffered data broadcast from the first wireless node for a preset time period.

19. The method of claim 17, wherein the buffered data broadcast by the first wireless node includes data of a transmission block that is a predetermined time period earlier than a transmission block of predetermined data being transferred when the connection with the mobile station is cut off.

20. The method of claim 18, wherein the buffered data broadcast by the first wireless node includes data of a transmission block that is a predetermined time period earlier than a transmission block of predetermined data being transferred when the connection with the mobile station is cut off.

21. The method of claim 17, wherein the step of transferring the buffered broadcast data received by the second wireless node to the mobile station comprises steps of:
excluding, by the second wireless node in response to the continuous-data-transfer request, data already received by the mobile station from the broadcast buffered data and transferring remaining data to the mobile station; and
notifying the first wireless node that the connection with the mobile station is established.

22. In a home network system comprising:
a server for storing multimedia data;
a plurality of wireless nodes for wireless connection;
a network for connecting the server to the plurality of wireless nodes;
and a mobile station for communicating with the server through a first wireless node of said plurality of wireless nodes, such that continuous data transfer between the server and the mobile station is maintained when the mobile station is moved between different wireless zones covered by corresponding ones of the wireless nodes, wherein;
said first wireless node senses that its connection to the mobile station is cut off, while the first wireless node is receiving predetermined data from the server through the network and transferring the received predetermined data to the mobile station;
when the connection with the mobile station is cut off, the first wireless node buffering the predetermined data to be transferred to the mobile station at a time point of disconnection with the mobile station in a state in which the first wireless node maintains a connection with the server;
a second wireless node establishing a connection to the mobile station when the mobile sation moves into the wireless zone covered by the second wireless node;
said mobile station transmitting a continuous-data-transfer request to said second wireless node in order to obtain said predetermined data from said server;
said second wireless node, in response to the continuous-data-transfer request, transmitting a search message to the said plurality of wireless nodes for searching for the buffered data, and establishing a connection with the first wireless node when the first wireless node responds to the search message with a reply message; and
said second wireless node receiving the buffered data from the first wireless node and transferring the received buffered data to the mobile station.

23. The home network system as set forth in claim 22, wherein the second wireless node receives predetermined data subsequent to the buffered data from the server through the first wireless node after transferring the received buffered data to the mobile station, and transfers the subsequent data to the mobile station.

24. The home network system as set forth in claim 23, wherein the search message comprises an ID (Identity or Identifier) of the mobile station and assigned address information.

25. The home network system as set forth in claim 22, wherein the predetermined data buffered by the first wireless node is data of a transmission block at a time point that is a predetermined time period earlier than when the connection with the mobile station is cut off.

26. The home network system as set forth in claim 22, wherein said second wireless node receives the buffered data from the first wireless node through the established connection, excludes data already received by the mobile station from the buffered data received from the first wireless node, and transferring remaining data to the mobile station.

27. In a home network system comprising:
a server for storing multimedia data;
a plurality of wireless nodes for wireless connection;
a network for connecting the server to the plurality of wireless nodes;
and a mobile station for communicating with the server through a first wireless node of said plurality of wireless nodes, such that continuous data transfer between the server and the mobile station is maintained when the mobile station is moved between different wireless zones covered by corresponding ones of the wireless nodes, wherein;
said first wireless node senses and notifies said server that its connection to the mobile station is cut off, while the first wireless node is receiving predetermined data from the server through the network and transferring the received predetermined data to the mobile station;
said server broadcasting the predetermined data, to be transferred to the mobile station, from to all the wireless nodes in the home network system, when notified that the connection between the first wireless node and the mobile station is cut off;
each of said wireless nodes temporarily storing the broadcast predetermined data;
a second wireless node establishing a connection to the mobile station when the mobile sation moves into the wireless zone covered by the second wireless node;
said mobile station transmitting a continuous-data-transfer request to said second wireless node in order to obtain said predetermined data from said server;
said second wireless node transferring, in response to said continuous-data-transfer request, the temporarily stored broadcast data to the mobile station, and notifying the server of the established connection; and
the second wireless node receiving from the server, data subsequent to the temporarily stored broadcast data and transferring the subsequent data to the mobile station.

28. The home network system as set forth in claim 27, wherein all the wireless nodes in the home network system temporarily store the predetermined data, broadcast from the server, for a preset time period.

29. The home network system as set forth in claim 27, wherein the first wireless node transfers, to the server, information about an ID (Identity or Identifier) of the mobile station and information about a transmission block of the predetermined data being transferred at a disconnection time point, in order to notify the server of the disconnection with the mobile station when the first wireless node senses that the connection with the mobile station is cut off.

30. The home network system as set forth in claim 27, wherein the predetermined data broadcast by the server, when connection with the mobile station is cut off, is data of a transmission block that includes data of a predetermined time period earlier than current data being transferred.

31. The home network system as set forth in claim 27, wherein the second wireless node, in response to the continuous-data-transfer request, excludes data already received by the mobile station from the temporarily stored broadcast data, transfers remaining data to the mobile station, and notifies the server that the connection with the mobile station is established.

32. In a home network system comprising:
a server for storing multimedia data;
a plurality of wireless nodes for wireless connection;
a network for connecting the server to the plurality of wireless nodes;
and a mobile station for communicating with the server through a first wireless node of said plurality of wireless nodes, such that continuous data transfer between the server and the mobile station is maintained when the mobile station is moved between different wireless zones covered by corresponding ones of the wireless nodes, wherein:
said first wireless node senses that its connection to the mobile station is cut off, while the first wireless node is receiving predetermined data from the server through the network and transferring the received predetermined data to the mobile station;
when the connection with the mobile station is cut off, the first wireless node buffering the predetermined data to be transferred to the mobile station at a time point of disconnection with the mobile station in a state in which the first wireless node maintains a connection with the server;
said first wireless node broadcasting the buffered data from the first wireless node to all the wireless nodes in the home network system, and all of said wireless nodes temporarily store the buffered data;
a second wireless node establishing a connection to the mobile station when the mobile sation moves into the wireless zone covered by the second wireless node;
said mobile station transmitting a continuous-data-transfer request to said second wireless node in order to obtain said predetermined data from said server;
said second wireless node, in response to the continuous-data-transfer request, transferring the temporarily stored buffered broadcast data to the mobile station, and notifying the first wireless node that the connection the mobile station is established; and
said second wireless node receiving, from the server through the first wireless node, data subsequent to the buffered broadcast data and transferring the subsequent data to the mobile station.

33. The home network system as set forth in claim 32, wherein all the wireless nodes in the home network system temporarily store the buffered data broadcast from the first wireless node for a preset time period.

34. The home network system as set forth in claim 32, wherein the buffered data broadcast by the first wireless node includes data of a transmission block that is a predetermined time period earlier than a transmission block of predetermined data being transferred when the connection with the mobile station is cut off.

* * * * *